United States Patent
Lee

Patent No.: US 6,473,395 B1
Date of Patent: Oct. 29, 2002

(54) METHOD FOR ALLOCATING WALSH CODES BY GROUP IN A CDMA CELLULAR SYSTEM

(75) Inventor: Kwang-Su Lee, Seoul (KR)

(73) Assignee: Samsung Electronics, Co., Ltd (KR)

(*) Notice: Subject to any disclaimer, the term of this patent is extended or adjusted under 35 U.S.C. 154(b) by 0 days.

(21) Appl. No.: 09/208,183

(22) Filed: Dec. 9, 1998

(30) Foreign Application Priority Data

Dec. 9, 1997 (KR) .......................................... 97-66984

(51) Int. Cl.$^7$ ................................................ H04J 13/02
(52) U.S. Cl. ........................ 370/209; 370/335; 370/342
(58) Field of Search .................................. 370/208, 209, 370/335, 342, 441, 479; 375/130, 139, 140

(56) References Cited

U.S. PATENT DOCUMENTS

| | | | | |
|---|---|---|---|---|
| 5,204,874 A | * | 4/1993 | Falconer et al. | 375/1 |
| 5,602,833 A | * | 2/1997 | Zehavi | 370/209 |
| 5,949,814 A | * | 9/1999 | Odenwalder et al. | 375/200 |
| 6,134,215 A | * | 10/2000 | Agrawal et al. | 370/209 |
| 6,185,246 B1 | * | 2/2001 | Gilhousen | 375/200 |

\* cited by examiner

Primary Examiner—Steven Nguyen
Assistant Examiner—Duc Duong
(74) Attorney, Agent, or Firm—Dilworth & Barrese, LLP

(57) ABSTRACT

A method for allocating Walsh codes by group in a CDMA (Code Division Multiple Access) cellular system is disclosed. The present invention provides a method for detecting the Walsh group having the minimum traffic group to minimize the time for allocating a call or transmitted data to an idle Walsh code, thereby, improving the performance of the system and reducing the time required to set up the call. The method includes the steps of dividing the Walsh codes into a plurality of Walsh groups; searching the plurality of Walsh groups to determine a Walsh group having the minimum traffic; identifying an idle Walsh code within the minimum traffic group; allocating the identified idle Walsh code to the call or data to be transmitted. If the call is completed or there is no additional data to be transmitted, then the method includes the steps of searching the plurality of Walsh groups, selecting the Walsh group having the Walsh code which had the call or transmitted data allocated thereto; selecting the Walsh code for removing; and removing the selected Walsh code. Preferably, these steps are performed by a BCS (Base station Call control Processor) at a CDMA base station.

14 Claims, 6 Drawing Sheets

FIG. 1
PRIOR ART

| WALSH CODE / STATE | OVERHEAD | | | | TRAFFIC | | | | | | | | | | | |
|---|---|---|---|---|---|---|---|---|---|---|---|---|---|---|---|---|
| | PILOT | PAGING | | SYNC | | | | | | | | | | | | |
| | W0 | W0 | ... | W7 | W32 | W8 | W9 | W10 | W11 | W12 | W13 | W14 | W15 | ... | W62 | W63 |
| S1 | B | B | ... | B | B | I | I | I | I | I | I | I | I | ... | I | I |
| S2 | B | B | ... | B | B | C1 | C2 | C3 | C4 | C5 | I | I | I | ... | I | I |
| S3 | B | B | ... | B | B | C1 | C2 | C3 | C4 | C4 | C6 | C7 | C8 | ... | I | I |
| S4 | B | B | ... | B | B | C1 | C2 | C3 | C4 | I | C6 | I | C8 | ... | I | I |
| S5 | B | B | ... | B | B | C1 | C2 | C3 | C4 | C9 | C6 | C10 | C8 | ... | I | I |

FIG.2

| | OVERHEAD | | | | TRAFFIC | | | | | | | |
|---|---|---|---|---|---|---|---|---|---|---|---|---|
| | PILOT | PAGING | | SYNC | GROUP1 | | | GROUP2 | | ... | GROUP8 | |
| WALSH CODE / STATE | W0 | W1 | ... | W7 | W32 | W8 | ... | W14 | W15 | ... | W21 | ... | W57 | ... | W63 |
| S1 | B | B | ... | B | B | H | ... | H | H | ... | H | ... | H | ... | H |
| S2 | B | B | ... | B | B | C1 | ... | H | C2 | ... | H | ... | C8 | ... | H |
| S3 | B | B | ... | B | B | C1 | ... | H | H | ... | H | ... | C8 | ... | H |
| S4 | B | B | ... | B | B | C1 | ... | H | C9 | ... | H | ... | C8 | ... | H |
| S5 | B | B | ... | B | B | H | ... | H | C9 | ... | H | ... | H | ... | H |
| S6 | B | B | ... | B | B | C10 | ... | H | C9 | ... | H | ... | C11 | ... | H |

FIG. 5

| CALL NUMBERS | PRIOR ART | THE PRESENT INVENTION | COMPARISON |
|---|---|---|---|
| 1 | 1 | 8 | -7 |
| 2 | 2 | 8 | -6 |
| .... | .... | 8 | -5 |
| 8 | 8 | 8 | 0 |
| 9 | 9 | 9 | 0 |
| 10 | 10 | 9 | 1 |
| .... | .... | .... | .... |
| 16 | 16 | 9 | 7 |
| 17 | 17 | 10 | 7 |
| .... | .... | .... | .... |
| 56 | 56 | 15 | 41 |
| n | n | 8+(n/8) | n-(8(n/8)) |

US 6,473,395 B1

METHOD FOR ALLOCATING WALSH CODES BY GROUP IN A CDMA CELLULAR SYSTEM

BACKGROUND OF THE INVENTION

1. Field of the Invention

The present invention relates to a CDMA (Code Division Multiple Access) cellular system, and more particularly it relates to a method for allocating Walsh codes by group in a CDMA cellular system.

2. Description of the Related Art

In a CDMA communication system, a plurality of subscribers utilize the same frequency concurrently. Therefore, each communication channel using the same frequency must be distinguished from every other communication channel. This is generally accomplished by utilizing a spreading code for separating the data signals from one another in a CDMA communication system. Two common spreading codes which are used are the PN (pseudo noise) code and the Walsh code. Both of these codes use 64-bit binary sequences.

The PN code, in common with all the signals in a cell or a sector in a CDMA mobile communication system, is utilized by the mobile station to distinguish the signals transmitting from multi-paths, different cells, and different sectors. The Walsh code is utilized to distinguish the signals corresponding to each mobile station in the cell or sector signals after PN coding. A Walsh code corresponds to a single row or column of the Hadamard matrix. For example, in a 64 channel CDMA spread spectrum system, particularly mutually orthogonal Walsh codes can be selected from the set of 64 Walsh codes within a 64 by 64 Hadamard matrix. Also, a particular data signal can be separated from the other data signals using a particular Walsh code to spread the particular data signal.

The bit pattern of above-noted 64 codes are arrayed according to the characteristics of the Walsh function. During the modulation, '0' is converted to '+V', and '1' to '−V', to have the orthogonality that, for random Walsh codes $W_a$ and $W_b$, the following equations apply: $W_a \oplus W_a = 1$, $W_b \oplus W_b = 1$, $W_a \oplus W_b = 0$, and $W_b \oplus W_a = 0$ for transmitting to the mobile station.

The 64 Walsh codes are distinguished as two types: one type being assigned to the overhead channels, and the other type being assigned to the traffic channels (see FIG. 1). The $0^{th}$ code is assigned to the pilot channel; the $1^{st}-7^{th}$ codes are assigned to the paging channels; the $32^{nd}$ code is assigned to the synchronization channel; and the remaining codes, i.e., the $8^{th}-31^{st}$ and the $33^{rd}-63^{rd}$ codes, are assigned to the traffics. In the case where the $1^{st}$ code is only utilized for the paging channel, the $2^{nd}-7^{th}$ codes (i.e., the remaining six codes) can be used as additional traffics.

In the existing CDMA DCS (Digital Cellular System) and CDMA PCS (Personal Communication Services), the Walsh codes are serially allocated according to the generated calls or data being transmitted. That is, referring to FIG. 1, if "n" calls occurred in a cell or a sector, the corresponding BCP (Base station Call control Processor) allocates respective "n" Walsh codes to the available codes code-by-code, except for the Walsh codes used for the overhead channels, i.e., the Walsh codes used for the pilot, the paging, and the synchronization channels.

Referring to FIG. 1, in the first state (S1), the Walsh codes for the pilot, the paging, and the synchronization are all BUSY (B), and all the Walsh codes for the traffics are IDLE (I). In the second state (S2), calls occurred corresponding to each of the following Walsh codes: W8, W9, W10, and W11. In the third state (S3), a plurality of calls are allocated serially corresponding to the following Walsh codes: W12, W13, W14, and W15. In the fourth state (S4), the calls corresponding to the $12^{th}$ and $14^{th}$ Walsh codes of the third state are removed making these Walsh codes IDLE (I). In the fifth state (S5), other calls are allocated to the $12^{th}$ and $14^{th}$ Walsh codes.

In the CDMA DCS and CDMA PCS system according to the prior art, when a call occurs, the Walsh codes are searched serially to determine an IDLE Walsh code, i.e., a Walsh code which does not have a call assigned thereto. This typically involves a long processing time, and, in case of concurrent calls, a caller may have to wait a certain time before his call is assigned to an IDLE Walsh code, thereby, increasing the time required to set up the caller's call.

SUMMARY OF THE INVENTION

It is an object of the present invention to provide a method for grouping the Walsh codes to reduce the load requirements when checking whether the Walsh codes are idle or busy.

It is another object of the present invention to provide a method for detecting the Walsh group having the minimum traffic group to minimize the time for allocating a call or data to be transmitted to an idle Walsh code, thereby, improving the performance of the system and reducing the time required to set up the call.

A preferred embodiment for grouping the Walsh codes in a CDMA DCS and CDMA PCS according to the present invention comprises the steps of initialization, allocation of the Walsh codes, and removal of the Walsh codes. The step of initialization includes the step of dividing the Walsh codes into a plurality of Walsh groups by assigning the number table of the Walsh codes to correspond to these groups. The step of allocation of the Walsh codes includes the steps of searching the plurality of Walsh groups to determine a Walsh group having the minimum traffic, and allocating an idle Walsh code within the minimum traffic group to a call or data to be transmitted. The step of removal of the Walsh code, after it is determined that the call has been completed, includes the steps of searching the Walsh group; selecting the Walsh code which had the call allocated thereto, selecting the Walsh code for removing, reducing the allocation counts of the selected Walsh group, and removing the selected Walsh code.

In the step of initializing, the number of groups the Walsh codes are divided into is determined according to the number of Walsh codes which can be allocated for the purpose of traffics. For example, the number of groups for the most efficient structure is determined by either of two numbers, where one number has the minimum value of the group x (the Walsh code number per group), and the remaining number is assigned as the number of Walsh codes per group. The number table is made to include a starting number of the Walsh code per group according to the determined number of groups.

In the step of allocating an idle Walsh code to a call, the BCP (Base station Call control Processor) of the CDMA base station iteratively checks the numbers of the allocated Walsh codes per group by utilizing the Walsh Group Allocation Count (Wg_Alloc_Cnt) table. This table stores the allocation counts for each of the plurality of Walsh groups. The group which has the minimum allocated Walsh codes is selected as the minimum traffic group. Therefore, the step of allocating the identified idle Walsh code to the call includes the steps of: identifying a starting Walsh code of the minimum traffic group as a starting point and identifying a starting Walsh code of a next group as an ending point using a Walsh group start table (this table stores the starting numbers of the Walsh codes for each of the plurality of Walsh groups); iteratively checking each Walsh code within the minimum traffic group until the idle Walsh code is identified; allocating the call or transmitted data to the identified idle Walsh code in the minimum traffic group; and changing the state of the Walsh code where the call or transmitted data was allocated to in a Walsh code state table from the "idle" to the "busy" state.

In the step of removing the Walsh code, when the removal of the allocated Walsh code is requested, the BCP of the CDMA base station searches the Walsh code group to locate the Walsh code to be removed by utilizing the Walsh Group Start Table. This table stores the number of the starting Walsh code of the Walsh code group which contains the Walsh code to be removed. After selecting the Walsh code to be removed, the allocation counts of the Walsh code is reduced by reducing the counter of the Walsh code's respective Walsh group in the Walsh Group Allocation Count table. The selected Walsh code is then removed by converting the "busy" state of the Walsh code to be removed into the "idle" state.

In the step of allocating the Walsh code to the minimum traffic group, if an "idle" Walsh code is not identified within the minimum traffic group, then this step terminates. Further, in the step of searching for the Walsh code to be removed, if the Walsh code group which contains the Walsh code to be removed is not selected, then the step of removing the selected Walsh code is terminated.

BRIEF DESCRIPTION OF THE DRAWINGS

FIG. 1 illustrates a table for allocating Walsh codes according to the prior art;

FIG. 2 illustrates a table for allocating Walsh codes according to an embodiment of the present invention;

FIG. 5 illustrates a table comparing the call numbers in the prior art and the present invention in the context of Walsh code allocation.

DETAILED DESCRIPTION OF THE PREFERRED EMBODIMENTS

Figure 3:
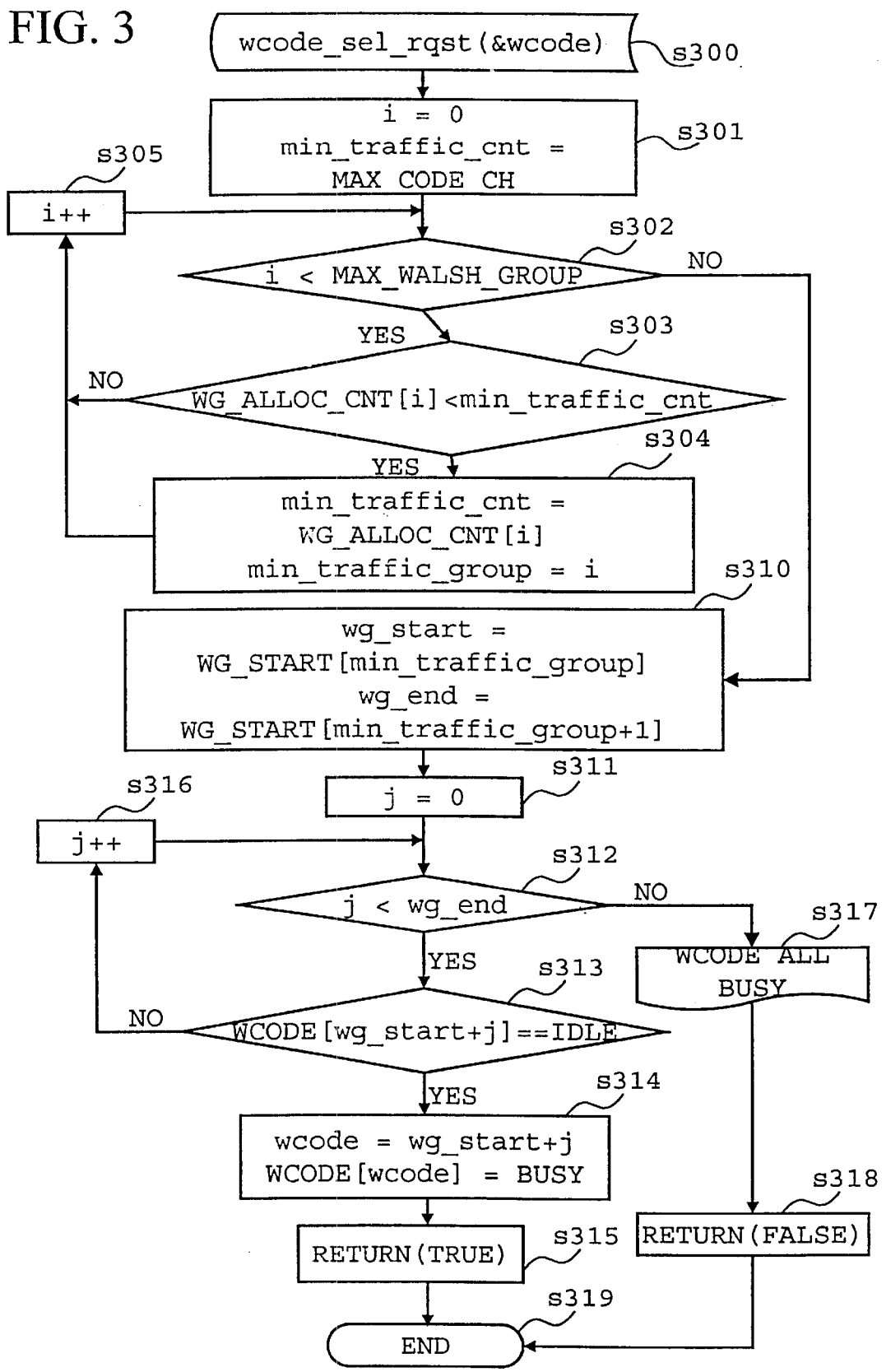
FIG. 3 illustrates a flow chart for allocating an idle Walsh code to a call according to an embodiment of the present invention.

The present invention will now be described in detail with reference to the accompanying drawings. Even though the present invention is described with reference to allocating Walsh codes to calls, it is contemplated that Walsh codes can be allocated to other data capable of transmission in a CDMA cellular system, such as facsimile, video, and audio-visual transmissions, within the context of the present invention. It is further contemplated that the method of the present invention is preferably performed by the BCP (Base station Call control Processor) of a CDMA base station.

A method of the present invention includes the step of dividing the Walsh codes into a plurality of groups. The number of groups the Walsh codes are divided into is determined according to the number of Walsh codes which have been allocated or are available for the purpose of traffics. For example, the number of groups for the most efficient structure is preferably determined by either of two numbers, where one number has the minimum value of the group x (the Walsh code number per group) and the remaining number of the two numbers is assigned as the number of Walsh codes per group. For example, if the number of the Walsh codes available for traffics is 56, the most efficient number for grouping is either 7 or 8. For illustrative purposes herein, the number 8 is selected as the number of groups and the number 7 as the number of Walsh codes per Walsh code group.

After the Walsh codes are divided into a plurality of groups, a Walsh group start (WG_START) table is configured to store the starting numbers of the Walsh codes for each group. In the example presented above which provides 8 Walsh code groups, the numbers stored within the WG_START table are 8, 15, 25, 29, 36, 43, 50, and 57.

With reference to FIG. 2, there is illustrated a table having the Walsh codes allocated into 8 groups according to the methodology of the present invention. In the first state (S1), the Walsh codes for the pilot, the paging, and the synchronization channels are all BUSY, and all the Walsh codes for the traffics are IDLE (I). In the second state (S2), the occurred calls are allocated serially to the first Walsh code (W8, W15, W22, ..., W57) of each group. In the third state (S3), the call of the second group is removed. In the fourth state (S4), the $9^{th}$ call is allocated to the second group of the above-noted third state. In the fifth state (S5), each call of the $1^{st}$ and $8^{th}$ group corresponding to the above-noted fourth state is removed. In the sixth state (S6), other calls are allocated to the first Walsh code of the $1^{st}$ and $8^{th}$ groups.

FIG. 3 illustrates a flow chart for allocating Walsh codes according to a preferred method of the present invention where "s" denotes a step. In FIG. 3, steps 300 to 305 show a method for finding the Walsh code group which has the minimum traffic; steps 310 to 319 show a method for allocating calls to Walsh codes within the Walsh group identified in steps 300 to 305.

With continued reference to FIG. 3, if a call is initiated, a request is made for a Walsh code to be allocated to the call (WCODE) in step 300. In step 301, the group index "i", which indexes one of the Walsh groups, and the maximum code channel number (Max_Code_Ch=64) are stored in the minimum traffic count (min_traffic_cnt). In step 302, the group index "i" is compared with the maximum Walsh code group (Max_Walsh_Group=8). If the group index is smaller than the maximum Walsh code group, the BCP of the CDMA base station refers to the Walsh Group Allocation Count (WG_Alloc_Cnt) table which stores the Walsh group allocation counts for each Walsh group (step 303). It is noted that the group index "i" is one number less than the Walsh code group it is indexing, since the group index "i" is originally initialized to equal 0 (i=0). If the group index is greater than the Max_Walsh_group, the process proceeds to step 310.

In step 303, if the Walsh group allocation count for the group being indexed by the BCP, is greater than the minimum traffic count (min_traffic_cnt), the process returns to step 305 where the group index "i" is incremented by one. If the Walsh group allocation count is determined by the BCP to be less than the minimum traffic count, the process proceeds to step 304. In step 304, the BCP selects the Walsh code group having the minimum Walsh code allocation counts as the minimum traffic group (min_traffic_group), i.e., the minimum traffic group is identified as the current Walsh group being referenced by the group index "i" (min_traffic_group=i).

After the minimum traffic group is selected, the starting Walsh code of the selected Walsh code group is set as the starting point, and the starting Walsh code of the next Walsh code group as the ending point (step 310). The starting Walsh code of the selected Walsh code group is indexed by the Walsh code index "j" in step 311. If the Walsh code being indexed is the last Walsh code in the selected Walsh code group as determined in step 312 the process proceeds to steps 317, 318 and 319 where it terminates. If the Walsh code being indexed is not the last Walsh code in the selected Walsh code group, the process proceeds to step 313.

In step 313, if the Walsh code being indexed is not idle, the process proceeds to step 316 where the Walsh code index is incremented by one, i.e., steps 312 and 313 are repeated for the succeeding Walsh code in the selected Walsh code group. If the Walsh code being indexed in step 313 is idle, the Walsh code being indexed is allocated to the call. The state of the Walsh code in the Walsh code state table is then changed to the "busy" state (step 314) and the process proceeds to steps 315 and 319 where it terminates.

Figure 4:
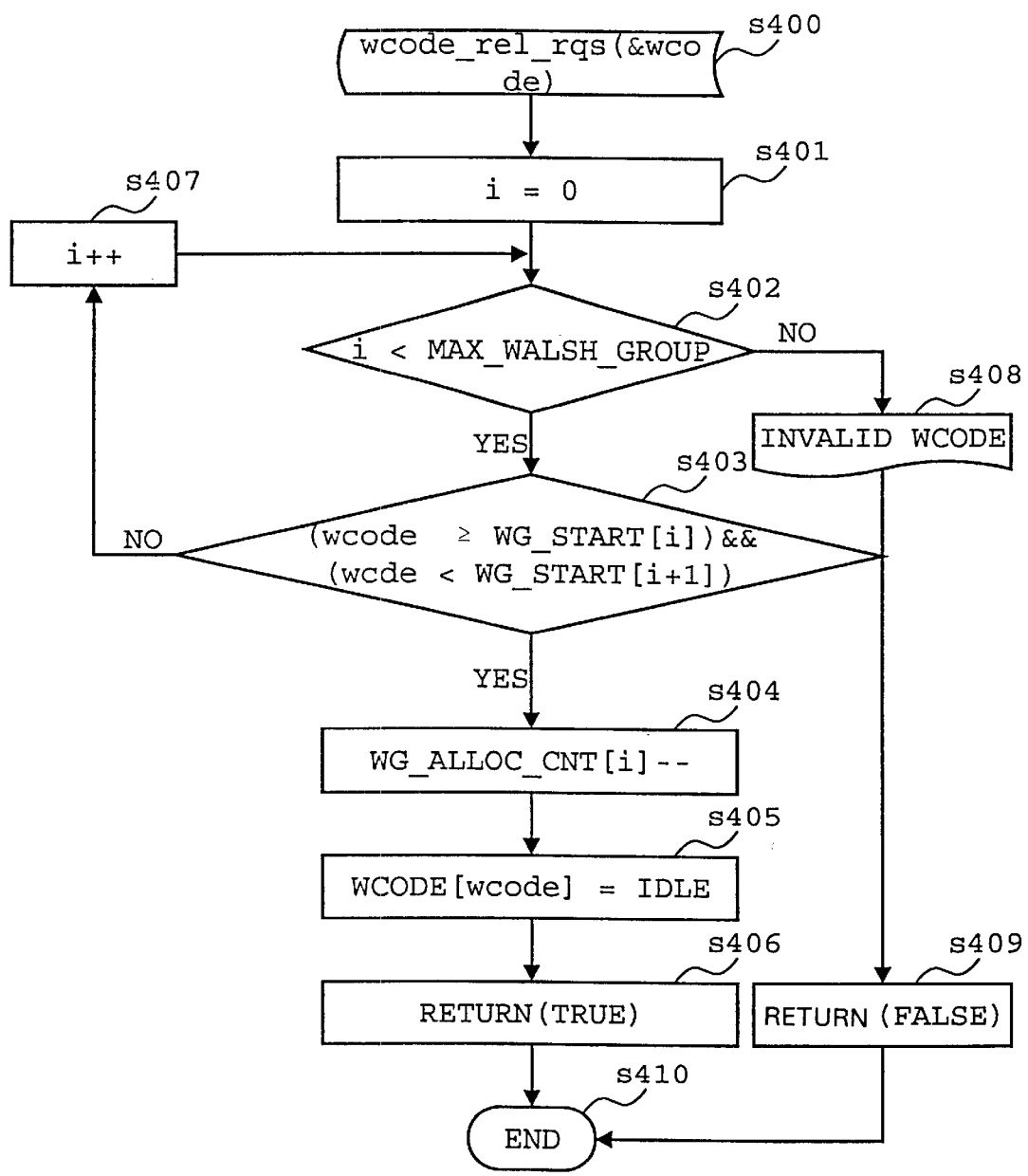
FIG. 4 illustrates a flow chart for removing a Walsh code allocated to a call according to an embodiment of the present invention.

FIG. 4 illustrates a flow chart for removing the allocated Walsh code groups, where as with FIG. 3, "s" denotes a step. If the removal of a particular Walsh code is requested in step 400, because the call or data allocated to that Walsh code has been completed or transmitted, respectively, the Walsh code number (wcode) of the particular Walsh code is recognized and stored. In step 401, the group index "i" is initialized to 0. In step 402, the BCP of the CDMA base station compares the group index "i" with the maximum Walsh code group. If the group index "i" is greater than the maximum Walsh code group the process proceeds to steps 408, 409 and 410 where it terminates.

If the group index "i" is less than the maximum Walsh code group, the process proceeds to step 403 where the BCP determines if the indexed group contains the Walsh code which was requested to be removed in step 400. The BCP utilizes the Walsh group start table which contains the numbers of the starting Walsh codes to make this determination. If it is determined that the requested Walsh code is not within the indexed group, the process proceeds to step 407 where the group index "i" is incremented by one to index the next Walsh group.

However, if in step 403, it is determined that the requested Walsh code to be removed is within the indexed group, the process proceeds to step 404. Step 403 determines if the requested Walsh code to be removed is within the indexed group by comparing the Walsh code number (wcode) of the requested Walsh code and determining if it is greater than or equal to the starting Walsh code number of the indexed Walsh code group and less than the starting Walsh code number of the succeeding Walsh code group.

After selecting the Walsh code group to be removed in step 404, the allocation counts of the Walsh code to be removed is reduced by reducing the counter of its respective Walsh group in the Walsh group allocation table. In step 405, the requested Walsh code is removed by converting the "busy" state of the Walsh code to the "idle" state. The process then proceeds to steps 406 and 410 where it terminates.

FIG. 5 shows a table comparing the number of comparison iterations performed until an idle Walsh code is found for being allocated to a call, among the Walsh codes assigned for traffics between the prior art and the present invention. When the number of occurred calls exceeds the number of divided groups (in the illustration herein, the number of groups the Walsh codes are divided into is 8), the comparison iterations in the prior art method increases steeply. But, the comparison iterations according to the methodology of present invention increases at a much slower rate. That is, if the number of calls exceeds the number of groups, the present invention reduces the time for setting up the calls and improves the overall performance of a CDMA cellular system as compared to prior art methods.

Figure 6:
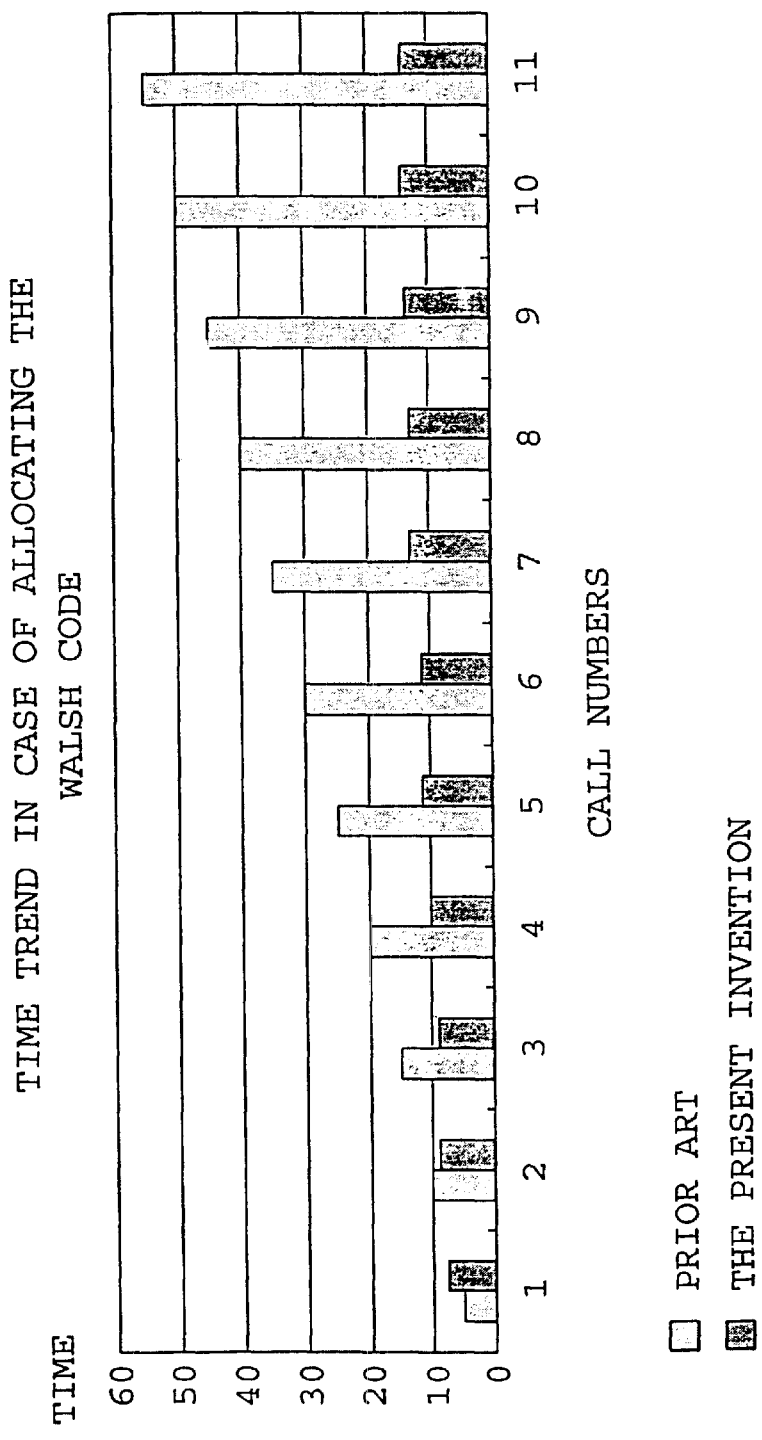
FIG. 6 illustrates a chart for comparing the amount of time required in allocating the Walsh codes to calls between the prior art and the present invention.

FIG. 6 illustrates a chart for comparing the amount of time required for allocating the Walsh codes to calls between the prior art and the present invention where the number of groups is 8. When the number of calls increases, the processing time required in the prior art increases tremendously, but the processing time required in the present invention increases slightly.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for allocating Walsh codes by group in a CDMA system, the method comprising the steps of:
   dividing the Walsh codes into a plurality of Walsh groups;
   searching said plurality of Walsh groups to determine a Walsh group having minimum traffic if a call is initiated;
   identifying an idle Walsh code within the determined Walsh group;
   allocating the identified idle Walsh code to the call;
   searching the plurality of Walsh groups to select a Walsh group having a Walsh code to be removed if the call is terminated;
   selecting the Walsh code which had the call allocated to be removed in the selected Walsh group; and
   removing said selected Walsh code in the selected Walsh group.

2. The method as set forth in claim 1, wherein the step of dividing determines the number of Walsh groups to divide the Walsh codes into according to the number of Walsh codes available, and by taking either of two numbers, where one number has a minimum value of group (the Walsh code number per group), and the remaining number of the two numbers being assigned as the number of Walsh codes per Walsh group.

3. The method as set forth in claim 1, wherein the step of dividing further comprises the step of assigning starting numbers to a Walsh code number table, said starting numbers corresponding to the first Walsh code in each of said plurality of Walsh groups.

4. The method as set forth in claim 1, wherein the step of searching the plurality of Walsh groups to determine a Walsh group having the minimum traffic comprises the steps of:
   iteratively checking the number of allocated Walsh codes in each of said plurality of groups by utilizing a Walsh group allocation count table, said table storing the number of allocations for each of said plurality of Walsh groups; and selecting one of said plurality of Walsh groups which has the minimum allocated Walsh codes as the minimum traffic group.

5. The method as set forth in claim 4, wherein the steps of iteratively checking and selecting are performed by a BCP (Base station Call control Processor) of a CDMA base station.

6. The method as set forth in claim 1, wherein the step of identifying an idle Walsh code within the determined Walsh group comprises the steps of:

identifying a starting Walsh code of the determined Walsh group as a starting point and identifying a starting Walsh code of a succeeding group as an ending point; and iteratively checking each Walsh code within the determined Walsh group until the idle Walsh code is identified.

7. The method as set forth in claim 1, wherein the step of allocating the identified idle Walsh code to the call comprises the step of changing the state of the identified Walsh code in a Walsh code state table from an idle state to a busy state.

8. The method as set forth in claim 1, wherein the step of selecting the Walsh group having the Walsh code which had the call allocated, comprises the steps of:

locating the Walsh group by utilizing a Walsh group start table, said table containing a plurality of Walsh code numbers where each number corresponds to a starting Walsh code of a corresponding Walsh group; and iteratively checking the Walsh codes within the Walsh group until the Walsh code which had the call allocated is located.

9. The method as set forth in claim 8, wherein the steps of locating and iteratively checking are performed by a BCP (Base station Call control Processor) of a CDMA base station.

10. The method as set forth in claim 1, wherein the step of removing the selected Walsh code comprises the step of reducing a counter of the Walsh group of which said selected Walsh code belongs to in a Walsh group allocation table, said table storing the number of allocations for each of said plurality of Walsh groups.

11. The method as set forth in claim 1, wherein the step of removing the selected Walsh code comprises the step of converting a busy state of the selected Walsh code to be removed to an idle state.

12. The method as set forth in claim 1, further comprising the step of terminating the step of identifying the idle Walsh code, when an idle Walsh code can not be identified.

13. The method as set forth in claim 1, further comprising the step of terminating the step of removing the selected Walsh code, when the Walsh code group having the Walsh code which had the call allocated is not selected.

14. A method for allocating Walsh codes by group in a CDMA system, the method comprising the steps of:

searching said plurality of Walsh groups to determine a Walsh group having minimum traffic if a call is initiated and identifying an idle Walsh code within said determined Walsh group;

allocating the identified idle Walsh code to the call;

searching the plurality of Walsh groups to select a Walsh group having a Walsh code to be removed if the call is terminated;

selecting the Walsh code which had the call allocated to be removed in the selected Walsh group; and removing said selected Walsh code in the selected Walsh group.

* * * * *